United States Patent Office 3,637,555
Patented Jan. 25, 1972

3,637,555
ADDITIVE SYSTEMS FOR ABS GRAFT COPOLYMERS
Paul J. Marinacci, Monroe, Conn., and Joseph M. Kelley, Westfield, Frederick E. Carrock, Paramus, and Edward E. Allemand, Oak Ridge, N.J., assignors to Dart Industries Inc., Los Angeles, Calif.
No Drawing. Filed Sept. 30, 1968, Ser. No. 763,906
Int. Cl. C08d 5/00; C08f 45/58
U.S. Cl. 260—23.7
11 Claims

ABSTRACT OF THE DISCLOSURE

ABS resins have improved stability against degradation due to heat and oxygen by addition of a balanced stabilizer composition which maintains initial color and impact strength, minimizes melt flow changes, and reduces tendency for carbonyl formation in the ABS resin during long term heat aging (LTHA). This composition comprises for example, 0.05 to 1.0 percent of each of the following constituents:

(1) DLTDP,
(2) 2,6-di-t-butyl-4-methylphenol,
(3) 2,2'-methylenebis(4-ethyl-6-t-butylphenol), and
(4) an epoxy compound derived from soybean oil or by the condensation of an ethylene oxide with a hydroxy-containing compound.

This composition can also contain small amounts of calcium stearate, for color stabilization.

BACKGROUND OF THE INVENTION

Field of the invention

This invention relates to polymeric compositions comprising a vinyl aromatic/alkenyl cyanide/diene rubber graft copolymer and a stabilizer system for protection of the polymeric compositions against degradation caused by exposure to heat and oxygen. More particularly, it relates to ABS resins (acrylonitrile/butadiene/styrene) and the like containing synergistic stabilizer systems.

The compositions of this invention find a wide variety of commercial applications as engineering plastics and structural and functional plastics in the appliance, housewares, automotive, construction, aerospace, business machine, and sporting good industries, and in the Government. Some of the more common examples of the numerous end-product applications of these versatile compositions include housings for electrical appliances and business machines; refrigerator liners; luggage; dashboards and panels; drain, waste and vent pipe and fittings in sanitary systems; fresh water distribution piping; trays and tote boxes; football and baseball helmets; and boat hulls and decks.

The tendency of ABS-type products to deteriorate under the influence of long exposures to heat and oxidation is evidenced by discoloration, carbonyl formation, changes in melt flow, increased brittleness and hence a decrease in impact strength. Thus, a complex problem exists in ABS technology to provide a balanced system of antioxidants and stabilizers to counteract this deterioration.

(2) Description of the prior art

ABS resins (also referred to as gum plastics) comprise rubber-modified thermoplastic resins and include graft copolymers of rubbery compositions with acrylonitrile and styrene monomers. The term "graft copolymer" as is known (Journal of Polymer Science, volume 8, page 260, 1962) signifies resins resulting from a process wherein a substrate composition such as a diene rubber which contains unsaturation is subjected to polymerization with a monomer or mixture of monomers whereby pendant chains (grafts) are formed on the substrate. The molecules therefore of the resulting graft copolymer consist of two or more polymeric parts which result from the polymerization of a rubbery substrate with monomeric materials as indicated. In general, gum plastics include what has also heretofore been described as high impact polystyrene where a rubbery diene is graft polymerized with styrene monomer.

ABS compositions of the prior art have included not only those compositions resulting in direct graft copolymerization of monomeric constituents onto a rubbery backbone substrate, but also those which were derived from blends, that is, mechanical blends of materials such as nitrile rubber with styrene-acrylonitrile resinous copolymers (SAN). In blending, compatibility became of extreme importance and in cases relating to blending of elastomers with a thermoplastic resin, if compatibility was at its maximum, other properties would also, in general, be at their maximum effectiveness.

The technology involving acrylonitrile-butadiene-styrene resins has become very complex and whereas simple systems such as those arising from the polymerization of styrene and acrylonitrile onto a rubbery diene substrate produce interpolymers classified as ABS resins, ABS technology has grown in complexity and a broad spectrum of properties are required for an ever expanding end use application. It is for this reason that finding a balanced additive system to stabilize all the various types of ABS resins presents such a difficulty to the industry.

Very little prior art is available which is directed to the problem of heat and oxidative degradation and to the solution of the problem by providing stabilization systems for ABS-type polymers. Known antioxidants and stabilizers have been added to such polymers in a random manner to solve individual problems such as processing stabilization or color degradation. However, none of the prior art ABS compositions has been disclosed which gives the proper balance of stabilizers to overcome all of the foregoing problems.

Bisphenolic antioxidant stabilizers have been used in combination with 2,6-di-t-butyl-4-methylphenol to stabilize natural rubber and rubbery synthetic polymers such as SBR; see U.S. Pat. 3,329,645. However, such rubbery materials do not have as complex a problem as those that are associated with ABS resins and therefore require a different type of solution.

SUMMARY OF THE INVENTION

An object of the present invention is to provide a vinyl aromatic/alkenyl cyanide/diene rubber graft copolymer with a balanced stabilizer system to improve the heat and oxidative stability of the copolymer.

Another object of this invention is to provide a new composition of matter containing a novel combination of antioxidants for stabilizing ABS-type graft copolymers subject to oxidative and heat degradation.

It is still a further object of this invention to provide a stable grade of high impact ABS by adding a novel stabilizer composition to a blend of different types of ABS compositions and SAN compositions.

The present invention provides a composition of matter comprising a vinyl aromatic/alkenyl cyanide/diene rubber graft copolymer and a stabilizer composition containing a diester of thiodipropionic acid consisting of dilauryl thiodipropionate (DLTDP) or distearyl thiodipropionate (DSTDP) or mixtures thereof; 2,6-di-t-butyl-4-methylphenol; 2,2'-methylenebis (4-alkyl-6-t-alkylphenol); and an epoxy compound either derived from soybean oil or linseed oil or prepared by the condensation of ethylene oxide or derivatives thereof with a hydroxy-containing compound.

The vinyl aromatic to alkenyl cyanide components in the graft copolymer are present in ratio of about 85/15 to 60/40.

The diene rubber is present in an amount of 3-60 percent based on the total weight of the graft copolymer.

A processing stabilizer, e.g., trisnonylphenyl phosphite, is usually present in the range from 0.05 to 1 percent based on the weight of the graft copolymer. This stabilizer is usually added during the polymerization steps for preparing the vinyl aromatic/alkenyl cyanide/diene rubber graft copolymer as discussed heerinbelow.

The constituents making up the stabilizer composition are each present in an amount of about 0.05 to 1.0 percent based on the weight of the graft copolymer.

The 2,2'-methylenebis(4-alkyl-6-t-alkylphenol) has the following formula:

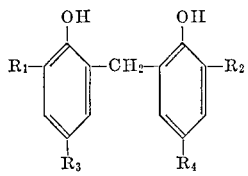

wherein each of $R_1$ and $R_2$ is an alkyl group having 1-8 carbon atoms and each of $R_3$ and $R_4$ is an alkyl group having 1-4 carbon atoms.

THE PREFERRED EMBODIMENTS OF THIS INVENTION

The preferred 2,2'-methylenebis-4-alkyl-6-t-alkylphenol) is 2,2'-methylenebis(4-ethyl-6-t-butylphenol) having the following formula:

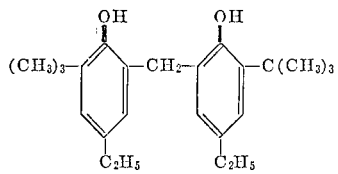

This additive compound can be purchased under the trademark "Plastonox® 425" from American Cyanamid Company.

One of the preferred epoxy compounds is an epoxydized soybean oil plasticizer having a specific gravity of 0.99 (25° C./15° C.) and a refractive index at 25° C. of 1.471. This epoxy compound can be purchased under the trademark "Paraplex® G-62" from Rohm & Haas Company. Another preferred epoxy is a mixture of branched di- and tri-epoxides made by the condensation of epichlorohydrin and glycerine. It has a viscosity of about 0.9 to 1.5 poises at 25° C. (ASTM D-154), an epoxide equivalent of 140 to 160, i.e., measured in grams of resin containing one gram-equivalent of epoxide (ASTM D-1652-59T) and a refractive index at 25° C. of 1.478. The latter epoxy compound can be purchased under the trademark "Epon® Resin 812" by Shell Chemical Company.

The term "graft copolymer" as used throughout this specification and claims means a copolymer obtained by polymerizing mixtures of vinyl aromatic and alkenyl cyanide monomers in the presence of a diene rubber to obtain a product in which some of the monomers are graft copolymerized onto the diene rubber. The vinyl aromatic monomers used in obtaining the graft copolymers of the composition of this invention include monovinyl aromatic compounds having the vinyl group attached directly to the carbon atom of the aromatic nucleus. Styrene is one of the preferred monovinyl aromatic compounds used in this composition. Examples of other compounds which can be used are the alkyl and/or halogen derivatives of styrene including the methylstyrenes, ethylstyrenes, isopropylstyrenes, butylstyrenes, including both the mono- and higher substituted alkyl forms, the chloro- and di- chlorostyrenes, as well as the mono- and dibromostyrenes and alkyl halostyrenes, or mixtures of these compounds with styrene or with each other. The alkenyl cyanides which can be used include acrylonitrile and methacrylonitrile. A minor portion of the foregoing monomers may be replaced by methyl methacrylate. Other vinylidene or vinyl compounds can be used such as methyl acrylate, methacrylic acid, acrylic acid, vinyl chloride and mixtures thereof.

Diene rubber as used herein refers to natural rubber or synthetic rubbers, such as SBR-type rubbers, which are copolymers of styrene and butadiene having 60 to 95 percent by weight of butadiene and from 40 to 5 percent of styrene; solution-polymerized linear random or block copolymer type SBR's wherein stereospecific catalysts are used and wherein the amount of butadiene can vary from 60 to 95 percent by weight of the monomeric mixture and in the more preferred embodiment, from about 70 to 95 weight percent; synthetic nitrile type rubbers containing from 50 to 90 percent by weight of butadiene and from 50 to 10 percent acrylonitrile; rubbery homopolymers of butadiene and of isoprene; the rubbery copolymers of isobutylene combined with butadiene or isoprene; and rubbery terpolymers of ethylene, propylene, and a minor amount of a diene monomer such as dicyclopentadiene. The preferred rubbery material is polybutadiene. Polybutadiene can be of the linear, solution polymerized type having a cis (polymerized by 1,4 addition) content of about 30 to 98 weight percent, preferably 35 to 60 weight percent. Preferably a minimum amount of the rubbery material is dissolved in the polymerizable monomers in the reaction zone and polymerized in bulk to form the rubber-modified polymer. Polybutadiene of the non-linear latex polymerized type can also be used.

Butadiene (or isoprene) polymerized by cis-1,4 addition exists in a rubbery form at ambient temperatures. The cis-1,4 form can be produced either by lithium metal or lithium alkyls or by a Ziegler-type catalyst system, as is well known in the art. These methods of polymerization yield linear polymers in contradistinction to a largely non-linear polymer obtained by well known emulsion polymerization recipes. The preferred cis-polybutadiene which can be employed in the compositions of this invention will have a viscosity between 20 to 80 as measured on the Mooney viscometer at 100° C. (ML4) (ASTM D-927-55T).

The rubbery materials used in this process usually have a molecular weight of about 15,000 and higher. They can be incorporated into the reaction mixture in amounts from about 3 to 60 percent by weight based on the total weight of the graft copolymer and more preferably the diene rubber is used in amounts of about 5 to 25 weight percent.

The graft copolymer of the composition of this invention also includes blends of vinyl aromatic/alkenyl cyanide/diene rubber graft copolymers obtained from various processes described hereinbelow and styrene/acrylonitrile resins. The SAN resins can be prepared according to procedures well known in the art and generally involves polymerization of the styrene and acrylonitrile monomers in a ratio of 85/15 to 60/40 and such polymerization is usually carried out in suspension or emulsion.

Numerous processes have been developed for preparing the ABS-type graft copolymers. These processes include bulk (or mass), solution, emulsion and suspension polymerization and combinations of these techniques.

For example, an ABS graft copolymer can be obtained with large particle size diene rubber dispersed in the styrene/acrylonitrile matrix by a bulk-suspension technique. The diene rubber is graft copolymerized in an initial step involving prepolymerization with agitation. In this prepolymerization step the polymerization is initiated after dissolution of the rubbers in the monomers and it is continued until phase inversion occurs and stirring is then continued until the diene rubber particle size of the precipitated rubber is reduced to the desired average size, i.e., from 1 to about 25 microns, preferably 1 to 10 microns. Subsequent to this, the polymerization mixture or prepolymer is transferred to an aqueous suspension to obtain ABS beads having from 3 to 25 percent rubber, preferably 5 to 15 percent rubber in the form of discrete particles dispersed throughout the resin matrix. The preferred procedure for polymerizing according to the above is described in U.K. Pat. 1,020,176 and the subject matter of said patent is incorporated herein by reference.

A latex-based ABS can be obtained with a butadiene rubber latex ranging from 3 to 60 percent rubber and having an average rubber particle size ranging from 0.005 to 1 micron. The butadiene latex can be prepared, for example, by polymerizing the butadiene rubber in an emulsion at about 50° C. in the presence of a small amount of persulfate catalyst and an anionic soap such as sodium lauryl sulfate. Styrene/acrylonitrile in the ratios of 80/20 to 70/30 is then polymerized in the presence of the polybutadiene latex. The polymerization is carried out in two steps. The first is a pregraft latex polymerization to prepare a graft copolymer latex containing, for example, 80 parts rubber and 20 parts styrene/acrylonitrile copolymer. The second step is carried out in suspension by the addition of the latex to a suspension of styrene/acrylonitrile monomer in water containing hydroxyethylcellulose. The polymerization is carried essentially to completion using an organic peroxide initiator to give a product containing about 40 percent rubber. Details of the procedure can be found in copending application Ser. No. 748,656, filed July 30, 1968.

The compositions of this invention can also contain optional ingredients such as pigments, delustrants, flame retardant materials, internal lubricants, processing aids and other materials known in the art.

It is well known to use metallic stearates, i.e., zinc, calcium, aluminum and magnesium stearates or mixtures thereof, with calcium stearate being especially preferred, as processing aids for various applications such as calendering and extrusion. It was found that in the melt processing of latex-based ABS resins, i.e., those resins having an average rubber particle size of from 0.005 to 1 micron, that the product was highly discolored, i.e., dark brown in color. However, it was discovered that if 0.05 to 1.0 weight percent, preferably 0.1 to 0.5 percent, of calcium stearate was added to the composition of this invention, the final product was white in color. It is believed that the effect, which was not found to be present in ABS resins prepared by the bulk-suspension process, was due to some of the inherent components in the latex-based resins, e.g., the soaps and the like used to prepare the latex-based resins.

To more clearly illustrate this effect, the following example is given. A blend was prepared consisting of 45 percent based on the weight of the blend of a latex-based ABS resin containing 44 percent based on the weight of the ABS resin of polybutadiene and having an average particle size of about 0.1 micron, prepared in accordance with the procedure described in the above section, and 55 percent based on the weight of the blend of SAN resin. The styrene to acrylonitrile ratio in both the latex-based ABS and the SAN resins was about 72 to 28. To this blend was added 0.2 percent based to the weight of the blend of 2,6-di-t-butyl-4-methylphenol sold under the trademark "Tenox® BHT," by Eastman Chemical Company. This blend was compounded in a melt extruder and resulted in a dark brown product. This procedure was repeated except that in addition 0.1 percent based on the weight of the blend of calcium stearate was added. The resulting melt extruded product was of a prime commercial color, i.e., white, and had an Izod impact strength of 5.7 ft.-lbs./in.(ASTM D-647) and a melt index of 1.4 gms./10 min. at 230° C.

One embodiment of the composition of this invention comprises a blend of the following:

(a) about 10 to 40 percent based on the weight of said blend of a latex-based ABS resin prepared as described above,
(b) about 10 to 90 percent based on the weight of said blend of the bulk-suspension ABS resin prepared as described above,
(c) 0 to 40 percent based on the weight of said blend of SAN resin, and
(d) a stabilizer composition comprising the following constituents based on the weight of said blend:
 (1) about 0.05 to 0.5 percent of trisnonylphenyl phosphite,
 (2) about 0.075 to 0.5 percent of DLTDP,
 (3) about 0.05 to 0.5 percent of 2,6-di-t-butyl-4-methylphenol,
 (4) about 0.075 to 0.5 percent of 2,2'-methylene-bis(4-ethyl-6-t-butylphenol),
 (5) about 0.05 to 0.5 percent of an epoxy compound derived from soybean oil or a mixture of di- and tri-epoxide prepared by the condensation of epichlorohydrin and glycerine, and
 (6) about 0.1 to 0.5 percent of calcium stearate.

The following examples are given to illustrate the invention and are not intended to limit its scope thereof. All percentages of the constituents making up the compositions of the controls and examples are based on the weight of the ABS resin.

EXAMPLE 1

This example illustrates the improvement in the thermal and oxidative stability of a composition of the present invention over the thermal and oxidative stability of a control. A commercial ABS resin prepared by a bulk-suspension process described in the foregoing section, in which the styrene/acrylonitrile was in a ratio of 75/25 and the butadiene rubber had a 35 percent cis-1,4 content, was present in the amount of 6 percent based on the weight of ABS resin and also contained 0.25 weight percent based on the weight of the ABS resin of trisnonyl-phenyl phosphite (sold under the trademark Polygard® HR), was mixed with the constituents indicated in Table I below in a dry powder blender until a homogeneous composition was obtained. The homogeneous mixture was melt extruded at 475° F., cooled and pelletized into ⅛" pellets. The pellets were then compression molded into 6" x 6" x 28 mil plaques at 425° F. and 2500 p.s.i.g. for 60 seconds. The plaques were rapidly cooled at the high pressure and cut into ½" x ½" x 28 mil strips. A number of the strips for both the example and the control were placed on an aluminum foil wrapped tray and put into a Model 625A Freas forced draft oven at 140° C. The strips were checked at the hourly intervals indicated in Table II below and one strip of the example and control were removed at these intervals for comparison with a color chart.

In Table I below the following abbreviations are used to identify the constitutents making up the ABS compositions:

2,2'-methylenebis(4-ethyl-6-t-butylphenol) is referred to below as methylenebisphenol;
dilauryl thiodipropionate is referred to below as DLTDP;
the epoxidized soybean oil plasticizer Paraplex® G-62 is referred to below as epoxy compound; and
the 2,6-di-t-butyl-4-methylphenol is referred to below as the trademarked product Ionol®.

TABLE I

|  | Percent methylene-bisphenyl | Percent DLTDP | Percent epoxy compound | Percent Ionol® |
|---|---|---|---|---|
| Control A | | | | 0.25 |
| Example 1 | 0.1 | 0.2 | 0.1 | 0.15 |

In Table II below the numbers for Example 1 and the control for each of the time periods indicated refer to numbers from a color chart which corresponds to the following colors:

| Number: | Color |
|---|---|
| 0 | White. |
| 1 | |
| 2 | Yellowish white. |
| 3 | |
| 4 | Light yellow. |
| 5 | |
| 6 | Yellow. |
| 7 | |
| 8 | Dark yellow. |
| 9 | |
| 10 | Orange. |
| 11 | Brown. |

TABLE II.—COLOR STABILITY

| Hours | Control A | Example 1 |
|---|---|---|
| 4 | 2 | 2 |
| 6 | 2 | 2 |
| 8 | 3 | 2 |
| 12 | 4 | 2 |
| 22 | 5 | 2 |
| 30 | 6 | 3 |
| 46 | (*) | 4 |

* No reading taken.

The Izod impact strengths of the control and the Example 1 composition were measured by ASTM D–256 on standard injection molded bars ½" x ⅛" x 5" which were molded according to ASTM D–647. The bars were cut in half and the dead end was tested for impact strength. A number of bars for the control and Example 1 were then placed in the Freas forced draft oven indicated above at 140° C. The Izod impact strength of the control and Example 1 bars were measured after periods of one and two weeks in the oven and the results indicated in Table III below:

TABLE III.—IZOD IMPACT STRENGTH STABILITY

| | Control A | | Example 1 | |
|---|---|---|---|---|
| Weeks | Ft.-lbs./in. | Percent retention | Ft.-lbs./in. | Percent retention |
| 0 | 1.4 | 100 | 1.0 | 100 |
| 1 | 0.5 | 36 | 0.9 | 90 |
| 2 | 0.5 | 36 | 0.6 | 60 |

A number of ½" x ½" x 28 mil strips for both the control and Example 1 composition were compression molded into a 5 mil film sample and analyzed in an Infrared Spectrophotometer for relative amounts of carbonyl. The analytical point for the Spectrophotometer was set at 5.7 microns, the point at which carbonyl groups absorb the infrared light. A number of film samples were placed in the Freas forced draft oven at 140° C. and Infrared Spectrophotometer analyses were taken of the control and Example 1 samples after the periods indicated in Table IV below.

TABLE IV.—STABILITY AGAINST CARBONYL FORMATION

| Hours | Control A | Example 1 |
|---|---|---|
| 0 | 0.4 | No change noted. |
| 20 | 0.79 | Do. |
| 40 | 1.75 | Do. |

Tables II, III and IV indicate that the composition of the present invention contains a balanced stabilizer system which protects the ABS resin against color degradation and reduction in impact strength and results in no carbonyl formation when this composition was subjected to long term heat aging.

EXAMPLES 2–7

Examples 2–7 further indicate the thermal and oxidative stability of compositions of the present invention containing various levels of constituents making up the stabilizer compositions indicated in Table V below. The ABS base resins for each of the stabilizer compositions of Table V were prepared by a bulk-suspension process described above in which the styrene and acrylonitrile were present in a ratio of 75/25 and the butadiene rubber having a 35 percent cis-1,4 content was present in the amount of 10 percent based on the weight of the ABS resin and contained 0.25 weight percent trisnonylphenyl phosphite. Examples 2–7 are compared in Table VI below against Control B which merely contained the ABS base resin. The strips of each of the compositions of Table V were prepared, oven tested and periodically checked for color degradation as indicated under Example 1 above.

TABLE V

| | Percent methylene-bisphenyl | Percent DLTDP | Percent epoxy compound | Percent Inol® |
|---|---|---|---|---|
| Example 2 | 0.3 | 0.1 | 0. | 0.25 |
| Example 3 | 0.1 | 0.3 | 50.1 | 0.25 |
| Example 4 | 0.1 | 0.1 | 0.5 | 0.25 |
| Example 5 | 0.1 | 0.3 | 0.5 | 0.25 |
| Example 6 | 0.3 | 0.1 | 0.1 | 0.25 |
| Example 7 | 0.3 | 0.3 | 0.1 | 0.25 |
| Control B | | | | |

Table VI below indicates the color stability results expressed in the numbers from a color chart as indicated above obtained after the compositions of these examples and Control B had been aged in the Freas forced draft oven at 140° C. for the number of hours indicated.

TABLE VI.—COLOR STABILITY

| | Hours | | | | | | |
|---|---|---|---|---|---|---|---|
| | 4 | 6 | 8 | 12 | 22 | 30 | 46 |
| Example 2 | 2 | 2 | 2 | 3 | 4 | 4 | 5 |
| Example 3 | 1 | 1 | 2 | 2 | 3 | 3 | 4 |
| Example 4 | 2 | 2 | 2 | 2 | 3 | 3 | 5 |
| Example 5 | 2 | 2 | 2 | 2 | 3 | 3 | 5 |
| Example 6 | 2 | 2 | 2 | 2 | 4 | 4 | 6 |
| Example 7 | 2 | 2 | 2 | 3 | 4 | 4 | 5 |
| Control B | 1 | 2 | 2 | 3 | 5 | 6 | 8 |

The Izod impact strengths for each of the compositions of Examples 2–7 were run on standard tensile bars as indicated under Example 1 above. The results are set forth under Table VII below:

TABLE VII.—IZOD IMPACT STRENGTH STABILITY

| | After 0 days ft.-lbs./in. | After 5 days | |
|---|---|---|---|
| | | Ft.-lbs./in. | Percent retention of impact strength |
| Example 2 | 6.7 | 4.4 | 71 |
| Example 3 | 7.8 | 5.7 | 73 |
| Example 4 | 8.6 | 5.0 | 59 |
| Example 5 | 7.6 | 4.6 | 61 |
| Example 6 | 7.6 | 6.6 | 87 |
| Example 7 | 6.7 | 6.7 | 100 |

In order to further evaluate the outstanding thermal and oxidative stability of the compositions of this invention, the compositions of Examples 2–7 were again measured for Izod impact strength, and for their melt indices according to ASTM D–1258 at 230° C. and using a 5000 gram load, and relative carbonyl levels as determined by the Infrared Spectrophotometer analysis indicated under Example 1. These measurements were used to establish the physical properties after a first extrusion at 475° F. which is common to all ABS resin products. The same measurements were then taken on samples that had undergone 5 and 10 successive melt extrusions at 475° F. The results from these measurements are summarized in Table VIII below:

TABLE VIII.—STABILITY AFTER REPEATED EXTRUSION

| | Melt index | | | Izod impact | | | Percent retention of Izod impact | Carbonyl levels | | |
|---|---|---|---|---|---|---|---|---|---|---|
| | 1 | 5 | 10 | 1 | 5 | 10 | | 1 | 5 | 10 |
| Example 2 | 0.9 | 1.0 | 1.0 | 6.3 | 7.5 | 5.3 | 84 | 0.7 | 0.6 | 0.6 |
| Example 3 | 0.8 | 0.9 | 1.5 | 7.8 | 6.9 | 6.5 | 83 | 0.8 | 0.8 | 0.8 |
| Example 4 | 0.8 | 0.7 | 0.5 | 8.6 | 7.1 | 7.7 | 90 | 0.8 | 0.8 | 0.7 |
| Example 5 | 0.7 | 0.5 | 1.0 | 7.6 | 5.8 | 4.6 | 60 | 0.8 | 0.8 | 0.7 |
| Example 6 | 1.1 | 1.1 | 1.1 | 7.6 | 6.4 | 3.2 | 42 | 0.6 | 0.6 | 0.6 |
| Example 7 | 0.8 | 0.5 | 0.8 | 6.7 | 6.2 | 4.5 | 67 | 0.6 | 0.7 | 0.9 |

EXAMPLE 8

The following blend was prepared in the manner described under Example 1 and melt extruded:

(a) 35 weight percent of a commercial ABS resin prepared by the bulk-suspension process described in the foregoing section in which the styrene/acrylonitrile was in the ratio of 72/28 and the polybutadiene had a 35 percent cis-1,4 content, was in an amount of 9 percent based on the weight of the ABS resin and had an average particle size in the range of about 1 to 5 microns;

(b) 35 weight percent of a commercial SAN resin prepared by a suspension process in which the styrene/acrylonitrile was in the ratio of 72/28, and had a melt index of 30 gms./10 min. at 230° C. using a load of 5000 grams (ASTM D–128);

(c) 30 weight percent of a commercial latex-based ABS resin prepared by the suspension process described in the foregoing section in which the styrene/acrylonitrile was in the ratio of 72/28 and the polybutadiene was in an amount of 44 percent based on the latex-based resin and had an average particle size of about 0.1 micron, and (d) a stabilizer composition consisting essentially of the following constituents based on the weight of the blend:
 (1) 0.085 percent trisnonylphenyl phosphite,
 (2) 0.2 percent DLTDP,
 (3) 0.265 percent 2,6-di-t-butyl-4-methylphenol, sold under the trademark Tenox® BHT,
 (4) 0.1 percent 2,2'-methylenebis(4-ethyl-6-t-butylphenol) sold under the trademark Plastonox® 425,
 (5) 0.035 percent of the condensation product of epichlorohydrin and glycerine sold under the trademark Epon® 812,
 (6) 0.05 percent calcium stearate, and
 (7) 0.5 percent of an internal lubricant sold under the trademark Acrawax® by Glyco Products Co.

The melt extruded product has substantially the same oven stability and substantially the same stability of the other properties on repeated extrusion as was found in the foregoing examples. Samples of this product were found to have an Izod impact strength of 6.7 ft. lbs./in. (ASTM D–647) and a melt index of 5.2 gms./10 min. at 230° C. and a load of 5000 grams (ASTM D–1238).

The foregoing examples indicate that the addition of the stabilizer compositions according to the teachings herein to a variety of types of ABS resins and blends thereof result in compositions which have excellent stability to withstand degradation caused by heat and oxygen.

Resort can be had to modifications and equivalents falling within the scope of this invention and the appended claims.

What is claimed is:

1. A composition of matter comprising a vinyl aromatic/alkenyl cyanide/diene rubber graft copolymer containing about 0.05 to 1.0 percent of each of the following constituents based on the weight of said graft copolymer:
 (a) trisnonylphenyl phosphite,
 (b) a diester of thiodipropionic acid consisting of dilauryl thiodipropionate or distearyl thiodipropionate or mixtures thereof,
 (c) 2,6-di-t-butyl-4-methylphenol,
 (d) 2,2'-methylenebis(4-alkyl-6-t-alkylphenol) having the following formula:

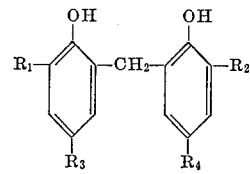

wherein each of $R_1$ and $R_2$ is an alkyl group having 1–8 carbon atoms and $R_3$ and $R_4$ is an alkyl group having 1–4 carbon atoms, and
 (e) an epoxy compound either derived from soybean oil or linseed oil or a mixture of di- and tri-epoxides prepared by the condensation of epichlorohydrin and glycerine.

2. A composition of claim 1 which also contains metallic stearates selected from the group consisting of zinc stearate, calcium stearate, aluminum stearate, magnesium stearate, and mixtures thereof in the amount of 0.05 to 1.0 percent based on the weight of said graft copolymer.

3. The composition of claim 1 wherein the vinyl aromatic and alkenyl cyanide components are present in a ratio of 85/15 to 60/40 and the diene rubber component is in an amount of 3 to 60 percent based on the weight of said graft copolymer.

4. The composition of claim 1 wherein the vinyl aromatic component is styrene and the alkenyl cyanide component is acrylonitrile.

5. The composition of claim 1 wherein the diene rubber component is a polybutadiene.

6. A composition of matter comprising an acrylonitrile/butadiene/styrene resin wherein the styrene and acrylonitrile components are present in a ratio of 85/15 to 60/40 and the butadiene component is present in an amount of 3 to 60 percent based on the weight of said resin, and a stabilizer composition containing the following constituents based on the weight of said resin:
 (a) about 0.05 to 0.5 percent of trisnonylphenyl phosphite,
 (b) about 0.075 to 0.5 percent of dilauryl thiodipropionate,
 (c) about 0.05 to 0.5 percent of 2,6-di-t-butyl-4-methylphenol,
 (d) about 0.075 to 0.5 percent of 2,2'-methylenebis(4-ethyl-6-t-butylphenol) having the following formula:

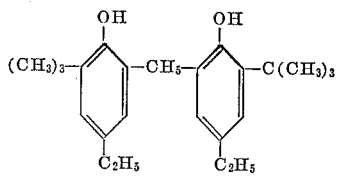

(e) about 0.05 to 0.5 percent of an epoxy compound derived from soybean oil or a mixture of di- and tri-epoxides prepared by the condensation of epichlorohydrin and glycerine.

7. A composition of matter comprising a latex-based acrylonitrile/butadiene/styrene resin wherein the vinyl aromatic and alkenyl cyanide components are present in the ratio of 85/15 to 60/40 and the butadiene component is present in an amount of 3 to 60 percent based on the weight of said resin and has an average particle size ranging from 0.005 to about 1 micron, and a stabilizer containing:
  (a) about 0.05 to 0.5 percent of trisnonylphenyl phosphite,
  (b) about 0.075 to 0.5 percent of dilauryl thiodipropionate,
  (c) about 0.05 to 0.5 percent of 2,6-di-t-butyl-4-methylphenol,
  (d) about 0.075 to 0.5 percent of 2,2'-methylenebis(4-ethyl-6-t-butylphenol) having the following formula:

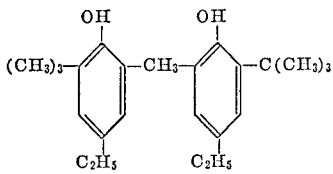

(e) about 0.05 to 0.5 percent of an epoxy compound derived from soybean oil or a mixture of di- and tri-epoxides prepared by the condensation of epichlorohydrin and glycerine, and
  (f) about 0.075 to 0.5 percent of calcium stearate.

8. A composition of matter comprising a blend of:
  (a) about 10 to 40 percent based on the weight of said blend of a latex-based resin, wherein the styrene and acrylonitrile components are present in the ratio of 80/20 to 60/40 and the butadiene component is present in an amount of 3 to 60 percent based on the weight of said resin and has an average particle size ranging from 0.005 to about 1 micron;
  (b) about 10 to 90 percent based on the weight of said blend of an acrylonitrile/butadiene/styrene resin wherein the styrene and acrylonitrile components are present in the ratio of 80/20 to 60/40 and the butadiene component is present in an amount of 3 to 60 percent based on the weight of said resin and has an average particle size ranging from 1 to about 25 microns;
  (c) 0 to 40 percent based on the weight of said blend of a styrene/acrylonitrile resin, wherein the styrene and acrylonitrile components are present in the ratio of 85/15 to 60/40, and
  (d) a stabilizer composition containing the following constituents based on weight of said blend:

(1) about 0.05 to 0.5 percent of trisnonylphenyl phosphite,
  (2) about 0.075 to 0.5 percent of dilauryl thiodiopropionate,
  (3) about 0.05 to 0.5 percent of 2,6-di-t-butyl-4-methylphenol,
  (4) about 0.075 to 0.5 percent of 2,2'-methylenebis(4-ethyl-6-t-butylphenol) having the following formula:

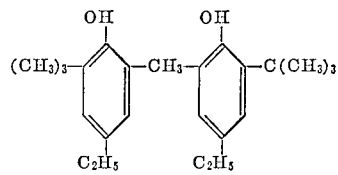

(5) about 0.05 to 0.5 percent of an epoxy compound derived from soybean oil or a mixture of di- and tri-epoxides prepared by the condensation of epichlorohydrin and glycerine, and
  (6) about 0.1 to 0.5 percent of calcium stearate.

9. The composition of claim 8 wherein the butadiene component comprises a mixture of diene rubbers selected from the group consisting of styrene and butadiene copolymers; synthetic nitrile type rubbers; rubbery homopolymers of butadiene; the rubbery copolymers of isobutylene combined with butadiene.

10. The composition of claim 8 wherein the butadiene component comprises a styrene/butadiene rubber containing 5 to 40 percent styrene.

11. The composition of claim 8 wherein the butadiene component comprises a butadiene/acrylonitrile copolymer containing 10 to 50 weight percent acrylonitrile.

References Cited
UNITED STATES PATENTS

| | | | |
|---|---|---|---|
| 3,267,069 | 8/1966 | Cummings | 260—45.75 |
| 3,355,421 | 11/1967 | Cook | 260—45.85 |
| 3,414,636 | 12/1968 | Ott et al. | 260—876 |
| 3,449,471 | 6/1969 | Weitzel et al. | 260—880 |
| 3,457,218 | 7/1969 | Haas et al. | 260—45.8 |
| 3,472,813 | 10/1969 | Hecker et al. | 260—45.75 |
| 3,479,315 | 11/1969 | Weisfeld | 260—30.8 |

DONALD E. CZAJA, Primary Examiner

R. A. WHITE, Assistant Examiner

U.S. Cl. X.R.

260—45.7, 45.8, 45.85, 45.95, 876